United States Patent [19]

Baker

[11] 4,370,788

[45] Feb. 1, 1983

[54] METHOD OF LINING CYLINDRICAL BORES

[75] Inventor: Archibald J. S. Baker, Wantage, England

[73] Assignee: Cross Manufacturing Company Limited, Oxfordshire, England

[21] Appl. No.: 184,239

[22] Filed: Sep. 5, 1980

[30] Foreign Application Priority Data

Sep. 7, 1979 [GB] United Kingdom ............... 7931186

[51] Int. Cl.$^3$ .......................................... B23P 11/00
[52] U.S. Cl. ........................ 29/156.4 WL; 29/234; 29/282; 72/398
[58] Field of Search ............. 29/156.4 WL, 282, 234, 29/149.5 S; 72/398, 54, 370; 113/116 UT

[56] References Cited

U.S. PATENT DOCUMENTS

| | | | |
|---|---|---|---|
| 380,107 | 3/1888 | Hall | 72/398 |
| 1,909,887 | 5/1933 | Otte | 72/54 |
| 1,950,726 | 3/1934 | Graybill | 72/398 |
| 2,005,577 | 6/1935 | Dowd | 29/234 |
| 2,674,782 | 4/1954 | Surtees | 29/156.4 WL |
| 4,013,284 | 3/1977 | Demetre | 72/54 |
| 4,136,431 | 1/1979 | Tucker | 29/282 |
| 4,185,368 | 1/1980 | Kammeraad | 29/156.4 WL |

FOREIGN PATENT DOCUMENTS

50-31111 10/1975 Japan ............................. 72/398
1325320 8/1973 United Kingdom ............ 72/398

*Primary Examiner*—Daniel C. Crane
*Attorney, Agent, or Firm*—Emory L. Groff, Jr.

[57] ABSTRACT

A method of lining a cylindrical bore for instance of an internal combustion engine with a thin-walled liner. Initially, a strip of material is cut to such a length that when formed into a cylindrical liner of external diameter equal to that of the unlined bore the liner is subjected to hoop-stress. The cut strip is pressed into a semi-circular groove in a jig-plate with a mandrel of at least part-circular form, and then two jig cheek-pieces each defining a quadrant-shaped groove are moved to deform the strip into a cylindrical shape. During this, the strip is held in the groove in the jig-plate for instance by electromagnets let into the jig-plate, or by a vacuum-holding technique. The grooves respectively in the jig-plate and jig-cheek pieces together define a cylinder of the same diameter as the bore to be lined, so that the liner is subjected to hoop-stress while in the jig. The liner is pressed out of the jig and into the bore, without releasing the hoop-stress, using an intermediate slave cylinder if required.

9 Claims, 10 Drawing Figures

METHOD OF LINING CYLINDRICAL BORES

BACKGROUND OF THE INVENTION (1) Field of the Invention

This invention concerns methods of lining cylindrical bores, such as the cylinders of internal combustion engines. In particular the invention relates to a method of lining a cylindrical bore by selecting a strip of lining material suitable for forming into a cylindrical liner and then press-fitting the formed liner into the cylindrical bore.

(2) Description of the Prior Art

It is known, as has been described for instance in British Patent Specification No. 1237962 and the Patent-of-Addition thereto No. 1395220, in the name of Cross Manufacturing Company (1938) Limited, that advantageous properties can be realised when the cylinder of an internal combustion engine is lined with a relatively thin-wall liner formed from a strip of material deformed to define the liner. The insertion of such a liner has proved to be somewhat difficult, especially on a production basis: such a liner cannot, for instance, simply be pressed into the bore without internal support as is a conventional thick-walled liner, for the thin-wall liner exhibits insufficient strength to withstand the relatively large axial force required to drive the liner fully home.

OBJECTS OF THE INVENTION

It is a principal object of this invention to provide a method of lining a cylindrical bore, especially in the case of a thin-walled liner, which is relatively easy and reliable to perform, allowing mass production of lined bores.

Another object of this invention is to allow the formation and insertion of a thin-walled liner into a cylindrical bore such that the inserted liner is subjected to hoop-stress.

Yet another object of this invention is the provision of a cylinder for instance of an internal combustion engine which cylinder has a thin-walled liner inserted therein and formed from a strip of material such that the inserted liner is subjected to hoop-stress.

SUMMARY OF THE INVENTION

In accordance with these and other objects, this invention in its broadest aspect provides a method of lining a cylindrical bore, which method comprises the steps of:

(a) selecting a strip of lining material of such a length that when said strip is formed into a cylindrical liner for said cylindrical bore and then pressed into said cylindrical bore, said formed strip is subjected to hoop-stress;

(b) by employing a jig-plate defining a groove of arcuate cross-section with a radius of curvature substantially equal to that of the unlined bore and a co-operable mandrel which has an at least partially circular cross-section the diameter of which is substantially equal to that of the lined bore, said jig-plate and co-operable mandrel being used to press said selected strip into said groove;

(c) retaining the partially-formed strip in the groove of the jig-plate and employing jig cheek-pieces each of which defines a part-circular groove of substantially the same radius of curvature as the groove in the jig-plate further to deform said strip by moving said jig cheek-pieces to a position in which said cheek-piece grooves and said jig-plate groove together define a cylinder of substantially the same diameter as that of the unlined bore, thereby enclosing and deforming said strip to form a cylindrical liner which is subjected to hoop-stress within the jig; and (d) pressing the thus-formed liner out of the jig into the cylindrical bore whilst maintaining the hoop-stress within said liner.

Further objects and the advantages of this invention will become apparent from the following description of preferred methods and examples of the invention.

BRIEF DESCRIPTION OF THE DRAWINGS

By way of illustration of the invention, it will now be described in greater detail and two specific methods of inserting liners in cylindrical bores given, referring to the accompanying drawings. In the drawings.

Initially, the various steps of the general method of this invention as described above will be explained in greater detail and preferred aspects thereof given; thereafter two specific methods will be described.

The length of the strip of lining material should be determined having regard to the thickness of the lining material and the diameter of the unlined bore into which the liner is to be inserted. Preferably, the length of the strip of lining material is cut slightly oversize, and is then ground to a finished length. For a mass production, several lengths could be cut, these then being clamped together and all ground simultaneously to the same finished length. The ground ends should be shaped so that an exact butt joint is formed therebetween on forming the liner from the cut and ground length, and consequently the ends should be ground dead square.

The material used should be selected having regard to the intended use of the lined bore, but for example in the case of an internal combustion engine, it has been found that flat, high carbon spring steel is suitable. The steel should be fully heat-treated for this application, for example to specification EN 42G. A typical range of thickness for making thin-walled liners from such a material would be from 0.25 mm to 0.56 mm (approximately 0.010" to 0.022"), with a thickness control of approximately ±0.0076 mm (approximately 0.0003"). Other materials, such as aluminium alloy or bronze, could of course be used, as well as other thicknesses.

The mandrel used to press the lining material into the groove in the jig-plate preferably is of wholly circular cross-section, and is provided with a plunger extending radially from the side thereof opposed to the groove in the jig-plate, the plunger being slidably mounted to allow movement of the mandrel towards and away from the groove. Conveniently, means are provided on the jig-plate to locate the lining material so that the transverse centre line thereof overlies the centre of the groove in the jig-plate, prior to being pressed by the mandrel.

Once the mandrel has been pushed fully into the groove, thereby partially forming the lining material, the lining material should be held firmly in the groove to allow the next stage of the forming process. For example, in the case of a ferro-magnetic lining material, the jig-plate may support a plurality of electromagnets disposed both around and along the length of the groove, as appropriate, which electromagnets may be energised so as to clamp the partially formed lining material to the face of the groove. The mandrel may be non-magnetic to allow removal thereof, or could instead also be of a ferro-magnetic material, in which latter case the mandrel will be clamped to the jig-plate when electromagnets are energised. Another possibility is to use a vacuum-clamping technique, in which the groove in the jig-plate is provided with a network of relatively shallow and narrow grooves, or even discrete orifices, the grooves or orifices communicating with a vacuum pump and the pump being actuated once the mandrel has been pushed fully home, so that the reduced pressure serves to clamp the lining material to the groove.

Once the lining material has been held in the manner just-described, the mandrel could be removed and replaced by another not having a radially-extending plunger, to allow further forming of the lining material. Alternatively, the plunger may be removed from the mandrel, to allow the next stage of the forming operation. Yet another possibility is to provide a mandrel which is of a length greater than the groove in the jig-plate, the mandrel being carried by suitable driving means at its ends, for instance between the two arms of a yoke. The mandrel may then be driven into the groove by the yoke acting on the two ends of the mandrel, and provided that the driving means does not overlap the groove, then the driving means may also be employed to maintain the partially-formed lining material in the groove in the jig-plate, during the next stage of the forming operation, by maintaining a force on the driving means.

The groove in the jig-plate is preferably substantially semi-circular in cross-section, and conveniently two similar cheek-pieces are provided for use therewith, each defining a quadrant-shaped groove. The cheek-pieces are preferably slidably mounted on the jig-plate, for sliding movement towards each other in a direction lying within the plane containing the diameter of the semi-circular groove in the jig-plate. Thus, as the two cheek-pieces are slid together, the free ends of the lining material will be formed by the grooves therein to butt one another. In the final stage of the movement of the cheek-pieces, and provided the length of the strip of lining material has properly been predetermined, the completed liner will be subjected to hoop-stress. When the cheek-pieces are moved to their final position, they should be locked together, by an appropriate means, thus completing the jig.

From the complete jig, the formed liner may be pressed either directly or indirectly into the cylindrical bore to be lined. For example, the jig could be positioned axially over the bore and in engagement therewith; if the mandrel has been left in position or replaced by another and provided that the mandrel has a flange thereon the radial extent of which is the same as the lining material thickness, the mandrel can be used to push the liner out of the jig and into the bore, whilst supporting the internal diameter of the liner during this pressing operation. If no mandrel is present, a separate plunger may be used to press the liner out of the jig.

Another possibility is to use an indirect process, in which the liner is pushed out of the jig into a sleeve the bore of which is substantially the same as that of the cylindrical bore to be lined, a slave mandrel being provided within the slave sleeve to support the liner therewithin. Subsequently, the liner may be pushed out of the slave sleeve directly into the cylindrical bore to be lined, using the slave mandrel. The advantage of this latter process is that the slave sleeve may be relatively small as compared with the jig and thus much easier to handle and to align with the cylindrical bore to be lined. In addition, a batch of such slave sleeves and mandrels may be pre-loaded with liners prepared in the same jig, the slave sleeves and mandrels then being stored until required for use.

The invention extends to a cylindrical bore (for instance of an internal combustion engine) whenever lined with a thin-wall liner in accordance with a method of this invention, as described above.

Reference will now be made to the drawings, to show precisely how two preferred methods of this invention may be performed.

Figure 1:
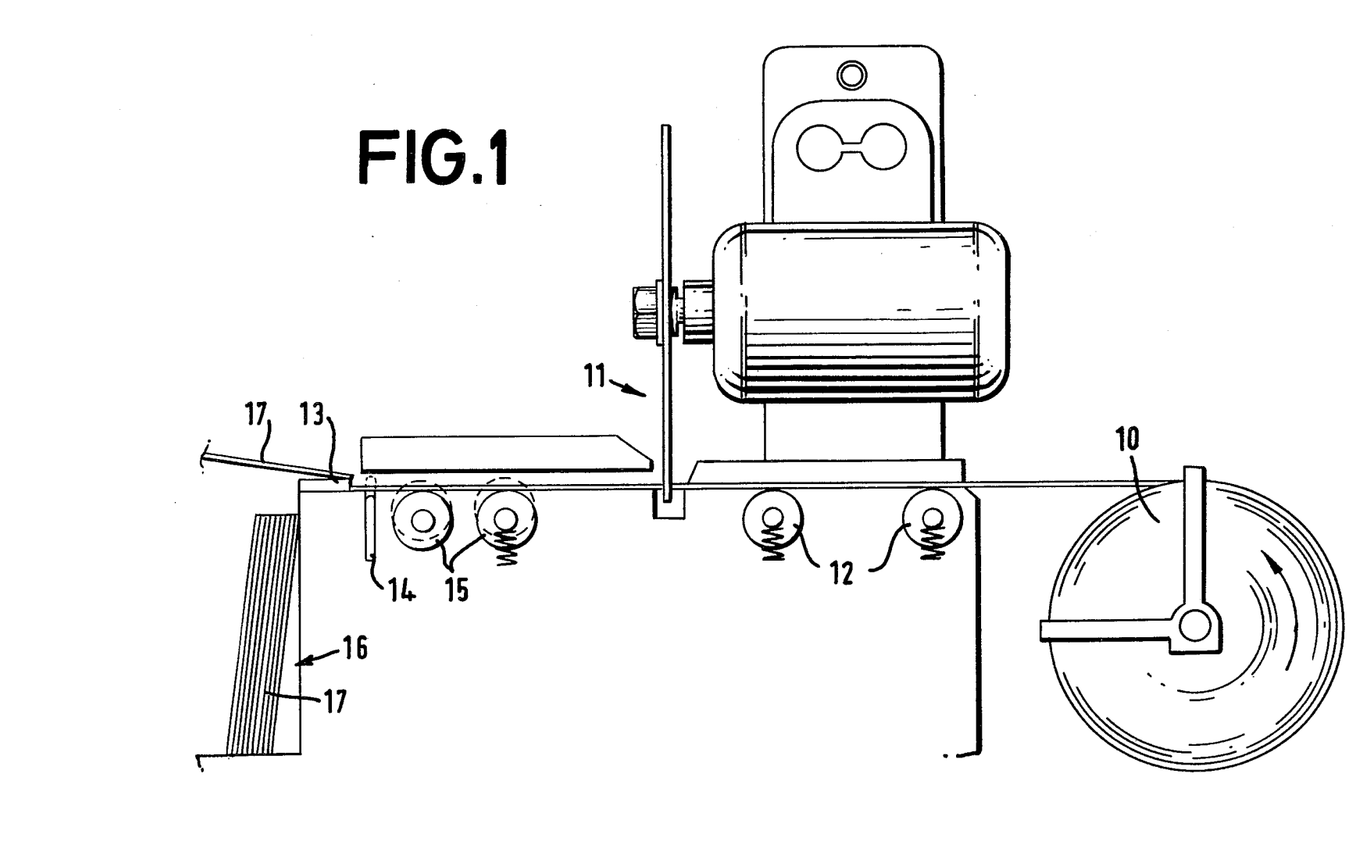
FIG. 1 is a diagrammatic sketch of a machine for cutting lengths of lining material from a coil thereof.

FIG. 1 shows a cutting machine for cutting lengths of strip material from a coil 10, using a power driven slitting saw 11. The material is drawn from the coil 10 by means of driven feed rollers 12 until the material engages an end stop 13; then, the slitting saw is traversed to sever the material and the length cut off is ejected by means of an ejector pin 14 and driver ejection rollers 15, to a receptacle 16.

Figure 2A:
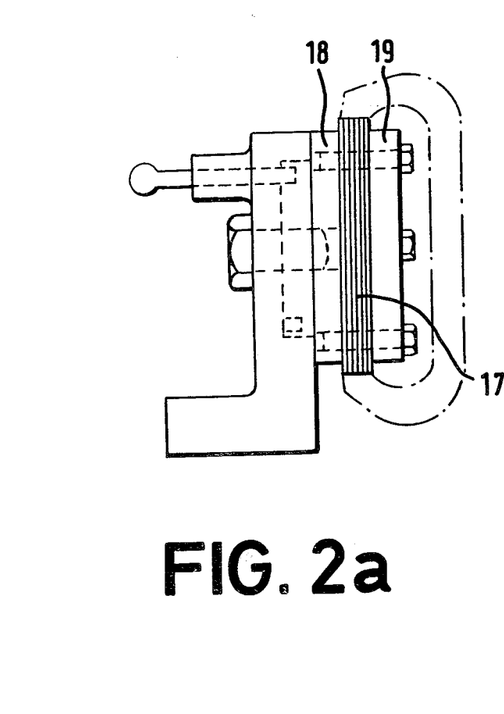
FIGS. 2a and 2b are sketches showing two views of a fixture allowing the finish-grinding of lengths of the lining material.
Figure 2B:
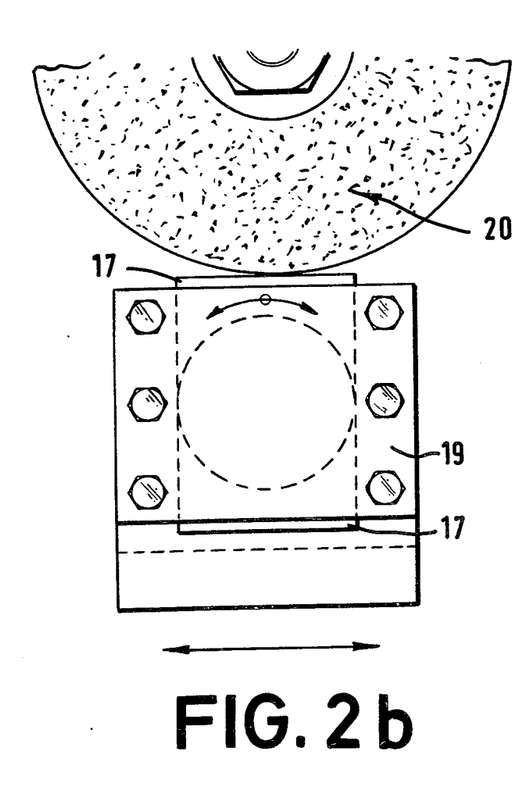

The cut off lengths are collated together and then held (for instance in batches of 100) in the fixture shown in FIG. 2. The stack of cut lengths 17 is clamped between two plates 18 and 19 of the fixture, and the fixture is then traversed beneath a surface grinding wheel 20, to finish-grind the ends of the cut-off lengths. This should provide dead square end faces precision ground to the required finish, each strip having precisely the same predetermined length. It is most important that the ends are ground properly, both to give the required degree of hoop-stress in the finished liner and to prevent formation of a gas leakage path along the butting end faces when the formed liner is inserted into the bore of an internal combustion engine.

Figure 3:
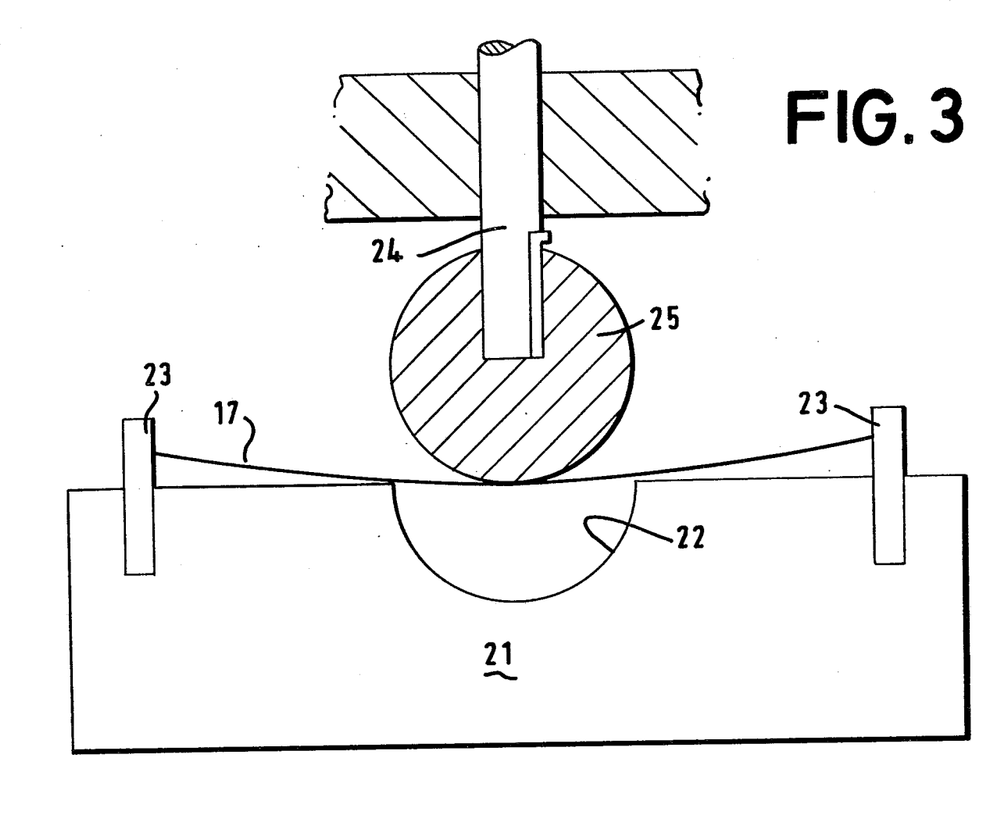
FIG. 3 shows diagrammatically the first step in a forming process for a liner.
Figure 4:
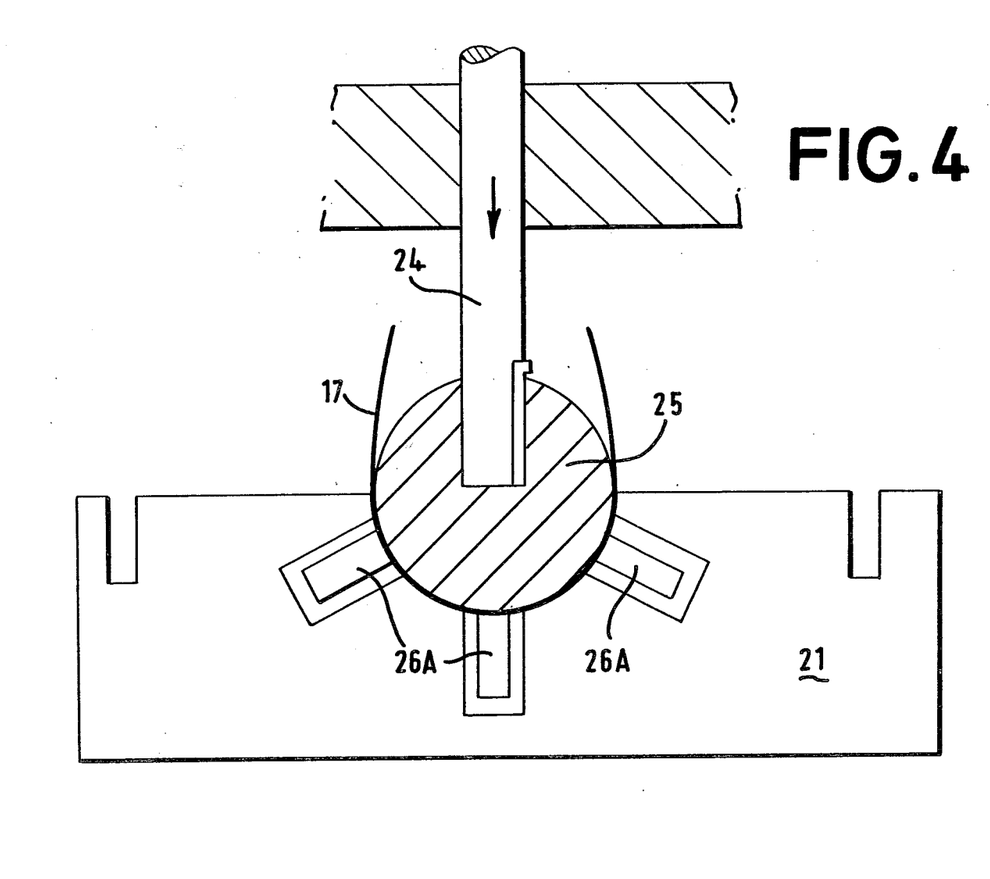
FIGS. 4 and 5 show further stages in the forming process.

The cut and ground lengths of lining material are supplied one at a time to a jig having a base plate 21 (FIG. 3) to overlie a semi-circular groove 22 formed in the base plate. The base plate 21 also supports a pair of removable stops 23, between which the cut material is located. A non-rotatable plunger 24 is suitably mounted for sliding movement above the groove 22 and supports a a non-magnetic mandrel 25 the axis of which extends parallel to the axis of the groove 22. As shown in FIG. 4, the mandrel is initially forced down towards the base plate 21, to form the lining material into a semi-circular shape with equal leg lengths extending upwardly from the groove 22. Electromagnets 26, positioned within the base plate 21, (as shown in FIG. 4) are then energised, to hold the material in the groove 22 and prevent the material springing out of the groove, when the force is removed from the plunger 24. Next, the plunger 24 is removed from the mandrel 25, leaving the mandrel partially within the groove 22, and the stops 23 also are removed from the base plate 21.

A pair of cheek-pieces 26 (FIG. 5) are then slid towards each other along the top face of the base plate 21, each cheek-piece defining a quadrant-shaped groove 27, the groove 22 and the two grooves 27 together defining a bore of circular cross-section when the cheek-pieces are touching each other centrally over the groove 22. In reaching this position, the upwardly-extending legs of the partially-formed liner are deformed around the mandrel 25, thereby completing the formation of a circular liner—and provided that the length of the material was properly predetermined beforehand, the liner will be subjected to hoop-stress as the cheek-pieces 26 move to their final position. A locking bar 28 is then used to hold the two cheek-pieces 26 together.

Figure 5:
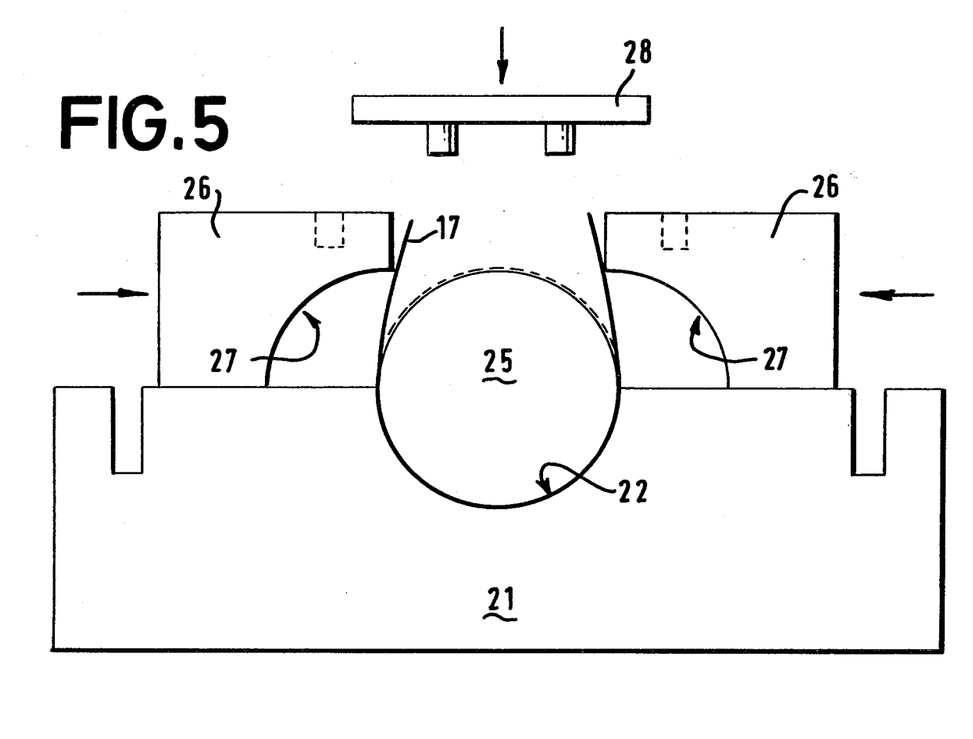

Next, the electromagnets in the base plate 21 are de-energised, leaving the liner fully supported externally by means of the base plate 21 and the cheek-pieces 26, with the mandrel 25 therewithin but free to be removed axially.

Figure 6:
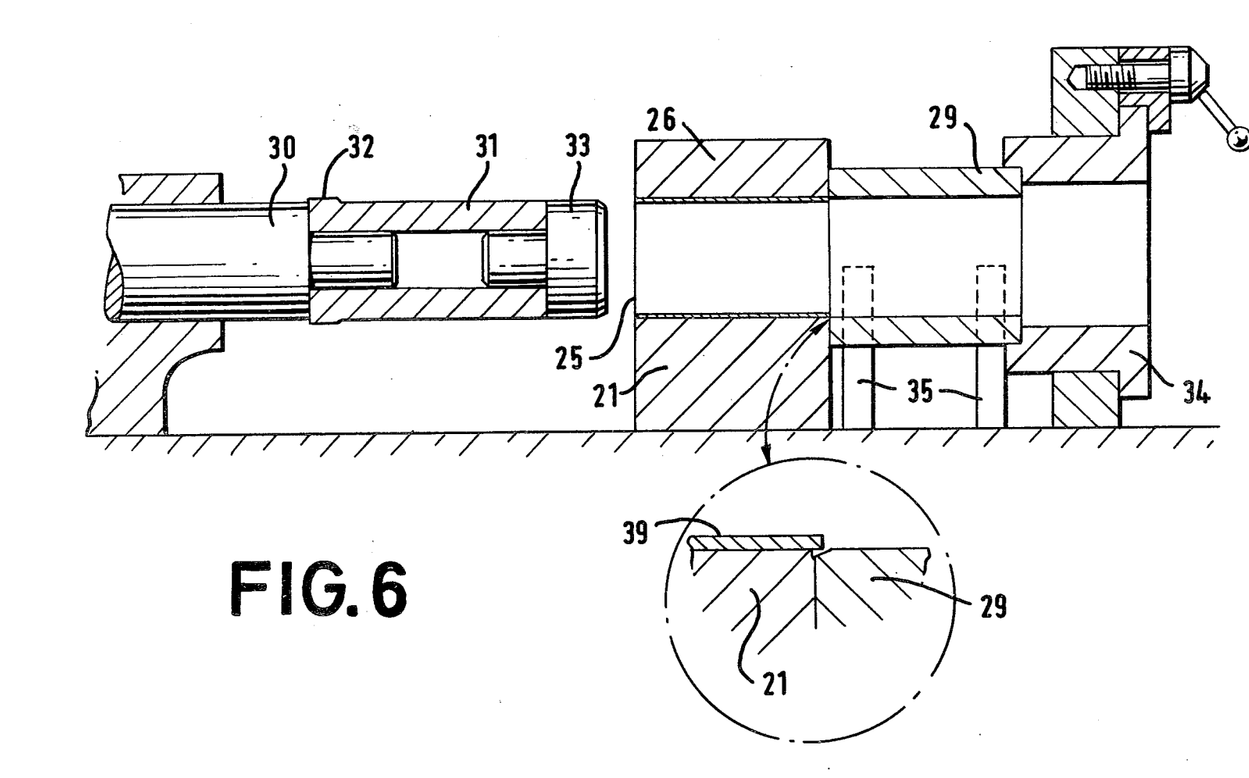
FIG. 6 shows the insertion of a formed liner into a slave sleeve.

In the next operation (FIG. 6) the formed liner is pushed out of the bore defined by the plate 21 and cheek-pieces 26, into a slave sleeve 29 (FIG. 6). This is performed by means of a guided linear actuator 30 supporting a slave mandrel 31 having a shoulder 32 at the end thereof adjacent the actuator 30, which shoulder has a radial extent equal to the radial thickness of the material of the liner. A plug 33 is provided at the opposite end of the slave mandrel and an appropriate supporting arrangement is provided for the slave sleeve 29, including an abutment bush 34 and alignment crotches 35. On operating the actuator 30, the mandrel 25 is pushed out of the formed liner by means of the plug 33 and eventually the shoulder 32 of the slave mandrel 31 engages the liner within the cylinder defined by the plate 21 and cheek-pieces 26. Further operation of the actuator 30 pushes the liner into the slave sleeve, until both the liner and the slave mandrel 31 are located wholly within the slave sleeve 29. Then, the apparatus of FIG. 6 may be dismantled, leaving the liner and slave mandrel within the slave sleeve, as shown in FIG. 7.

Figure 7:
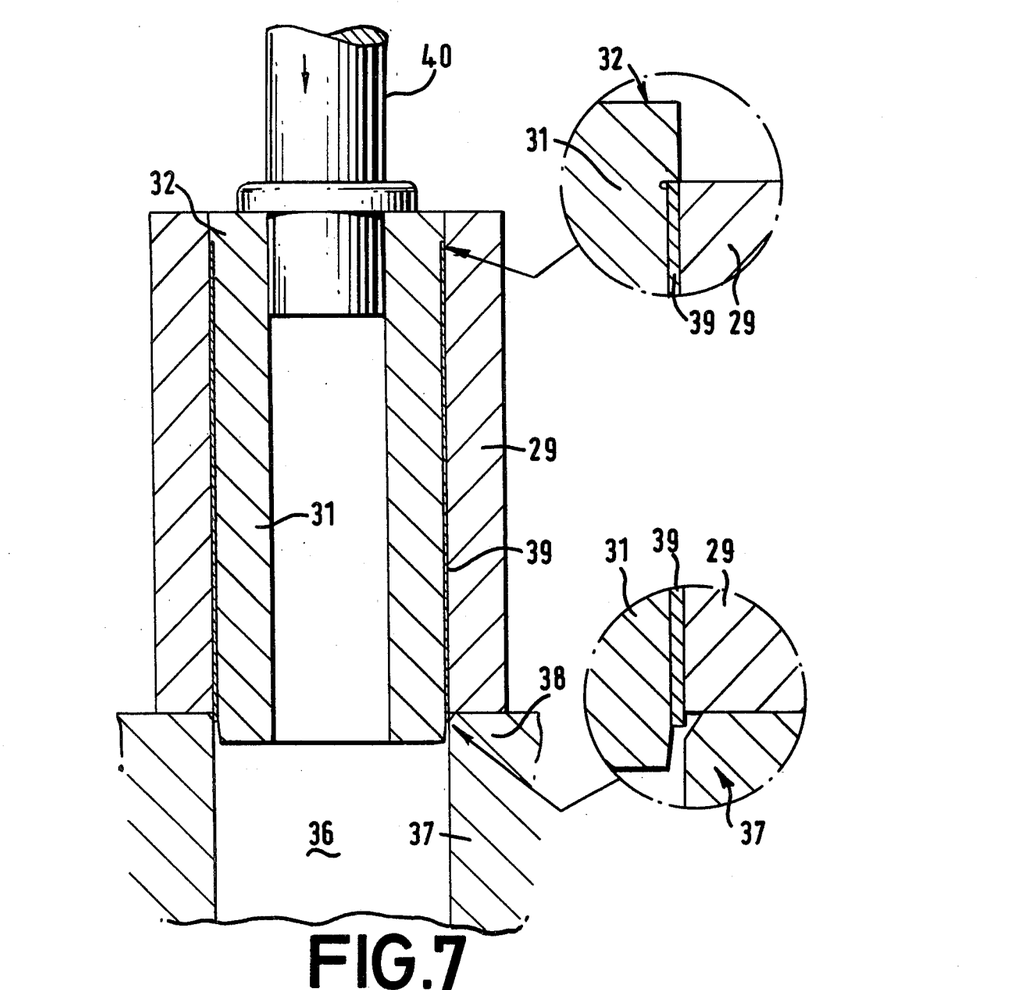
FIG. 7 shows the initial stage of the insertion of a liner into a bore in a cylinder block, from a slave sleeve.

Also shown in FIG. 7 is the bore 36 of a cylinder block 37, and it can be seen that the top lip of the bore should be relieved as shown at 38, to allow relatively easy insertion of the liner 39 into the bore, when the slave mandrel 31 is pushed by means of a rod 40 engaged therewith. Once the liner 39 is fully home within the bore 35, the slave mandrel 30 may be removed therefrom.

Figure 8:
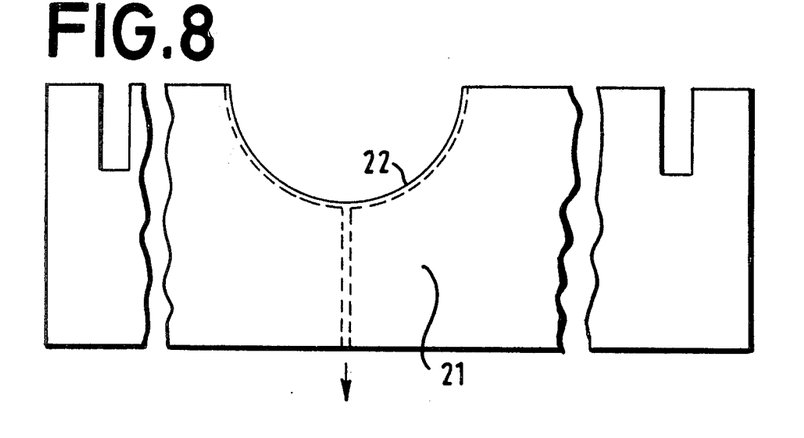
FIGS. 8 and 9 are respectively side and plan views of a second embodiment of jig-plate having a semi-circular groove therein, for use in the forming of a liner.
Figure 9:
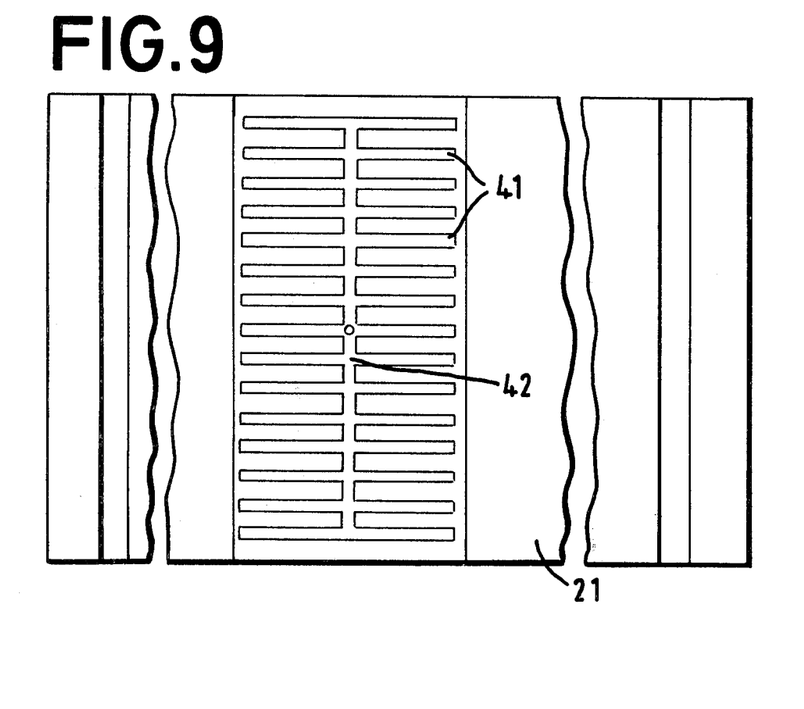

FIGS. 8 and 9 show an alternative embodiment of the base plate 21. Instead of the base plate being provided with electromagnets (as shown in FIG. 4), the groove 22 is instead provided with a matrix of relatively shallow and relatively narrow interconnected grooves 41, all of the grooves communicating with a duct 42 extending through the plate. This duct 42 can be connected to a vacuum pump, so that when the pump is operated, the lining material will be clamped to the semi-circular groove in the plate, in a similar way to that described above using the electromagnets. It is preferred for the vacuum pump to produce a depression of at least 712 mm Hg. Such a method is applicable for instance to non-magnetic liner materials, such as bronze or aluminium alloys. The method could also be used for steel liners, such as liners made of high carbon fully-heat treated spring steel.

What is claimed is:

1. A method of lining a cylindrical bore, which method comprises the steps of:
    (a) providing a block having a cylindrical bore;
    (b) selecting a strip of lining material having free ends and of such a length that when said strip is formed into a cylindrical liner for said cylindrical bore and then pressed into said cylindrical bore, said formed strip is subjected to hoop-stress;
    (c) providing a jig-plate defining a groove of arcuate cross-section with a radius of curvature substantially equal to that of the unlined bore and a cooperable mandrel which has an at least partially circular cross-section the diameter of which is substantially equal to that of the lined bore;
    (d) positioning said strip of lining material in said jig-plate and employing said jig-plate to press said selected strip into said groove;
    (e) retaining the partially-formed strip in the groove of the jig-plate and employing jig cheek-pieces each of which defines a part-circular groove of substantially the same radius of curvature as the groove in the jig-plate further to deform said strip by moving said jig cheek-pieces with respect to said jig-plate to a position in which said cheek-piece grooves and said jig-plate groove together define a cylinder of substantially the same diameter as that of the unlined bore, thereby enclosing and deforming said strip with said free ends abutting one another to form a cylindrical liner which is subjected to hoop-stress within the jig; and
    (f) pressing the thus-formed liner out of the jig into the cylindrical bore whilst maintaining the hoop-stress within said liner thereby forming a lined block.

2. A method as claimed in claim 1, in which said strip is pressed by said mandrel into said groove in the jig-plate which is substantially semi-circular in cross-section, and subsequently two said jig cheek-pieces are employed to finish forming said strip, each of which jig cheek-pieces defines a substantially quadrant-shaped groove.

3. A method as claimed in claim 1, in which said strip is cut from a length of flat, high carbon spring steel.

4. A method as claimed in claim 3, in which the strip has a thickness in the range of from 0.25 mm to 0.56 mm.

5. A method as claimed in claim 1, in which said mandrel used to press said strip is of wholly circular cross-section, and is provided with a plunger extending radially from the side thereof opposed to said groove in said co-operating jig-plate, said plunger being slidably mounted to allow movement of said mandrel towards and away from said groove.

6. A method as claimed in claim 1, and in which said strip is cut from a length of ferro-magnetic material, wherein electromagnetic means associated with said jig-plate are employed to retain said partially formed strip in the groove once said strip has been pressed into said groove by the mandrel.

7. A method as claimed in claim 1, in which suction means are provided to apply suction to said groove in said jig-plate, the suction being applied after the partially formed strip has been pressed into said groove by the mandrel so as then to hold said partially formed strip in said groove.

8. A method as claimed in claim 1, in which said mandrel has a greater length than the axial length of said groove in the jig-plate, wherein said mandrel is driven into the groove partially to form the strip by driving means acting on the ends of said mandrel beyond the axial extent of said groove, said driving means maintaining said mandrel in the groove whilst the jig cheek-pieces are moved to complete the formation of the liner from said strip.

9. A method as claimed in claim 1, wherein the liner formed from said strip is indirectly pressed into the cylindrical bore to be lined, by first pushing with a slave mandrel said formed liner out of the jig into a slave sleeve the bore of which is substantially the same as that of the cylindrical bore to be lined, said slave mandrel supporting the liner within said slave sleeve, and subsequently, pushing said liner out of said slave sleeve directly into the bore to be lined by using said slave mandrel to exert axial force on said liner.

* * * * *

UNITED STATES PATENT AND TRADEMARK OFFICE
CERTIFICATE OF CORRECTION

PATENT NO. : 4,370,788
DATED : February 1, 1983
INVENTOR(S) : Archibald J. S. Baker It is certified that error appears in the above-identified patent and that said Letters Patent is hereby corrected as shown below:

On the title page, Assignee should read

-- /73/ Assignee: Cross Manufacturing Company (1938) Limited

Bath, Avon, England and

Archibald J. S. Baker, Wantage

Oxfordshire, England --.

Signed and Sealed this

Fourth Day of December 1984

[SEAL]

Attest:

GERALD J. MOSSINGHOFF

Attesting Officer

Commissioner of Patents and Trademarks